US009747794B1

(12) United States Patent
Oliver et al.

(10) Patent No.: US 9,747,794 B1

(45) Date of Patent: Aug. 29, 2017

(54) METHOD AND APPARATUS FOR IMPLEMENTING A VEHICLE INSPECTION WAIVER PROGRAM

(71) Applicant: ZONAR SYSTEMS, INC., Seattle, WA (US)

(72) Inventors: Chris Oliver, Normandy Park, WA (US); Charles Michael McQuade, Issaquah, WA (US); Fred Fakkema, Des Moinse, WA (US); Brett Brinton, Seattle, WA (US); William Brinton, Jr., Kent, WA (US)

(73) Assignee: Zonar Systems, Inc., Seattle, WA (US)

( * ) Notice: Subject to any disclaimer, the term of this patent is extended or adjusted under 35 U.S.C. 154(b) by 171 days.

(21) Appl. No.: 14/287,184

(22) Filed: May 26, 2014

Related U.S. Application Data

(63) Continuation of application No. 12/959,182, filed on Dec. 2, 2010, now Pat. No. 8,736,419.

(51) Int. Cl.
*G05B 19/00* (2006.01)
*G08G 1/0962* (2006.01)

(52) U.S. Cl.
CPC .................................. *G08G 1/0962* (2013.01)

(58) Field of Classification Search
CPC . G07C 5/008; G07C 5/08; G07C 9/00; G07C 5/00; G06F 7/04; G05B 19/00; G01G 19/00; G01G 19/02; G01G 19/03; G05D 1/0027; G05D 1/0287; G05D 1/0291; G06Q 50/30; G08G 1/00; G08G 1/09; G08G 1/0962; G08G 1/09623; G08G 1/123; G08G 1/20; G08G 1/22
USPC ......... 340/5.2, 5.7, 5.8, 6.1, 539.1, 928, 933
See application file for complete search history.

(56) References Cited

U.S. PATENT DOCUMENTS

| | | | | |
|---|---|---|---|---|
| 5,748,106 A * | 5/1998 | Schoenian | ........... | G07B 15/063 340/7.32 |
| 6,980,093 B2 * | 12/2005 | Oursler | .................. | G01G 19/02 235/384 |
| 2010/0207760 A1 * | 8/2010 | Stomski | .................. | B60R 25/00 340/540 |
| 2011/0137773 A1 * | 6/2011 | Davis, III | ............. | G06Q 30/04 705/34 |

* cited by examiner

*Primary Examiner* — Brian Wilson

(57) ABSTRACT

Position data received wirelessly from a vehicle enrolled in an inspection waiver program are employed to determine when the enrolled vehicle is approaching an inspection station. After determining that the enrolled vehicle is approaching an inspection station, and if the enrolled vehicle has a valid inspection waiver, a bypass confirmation can selectively be provided to the vehicle operator, authorizing the operator to bypass the inspection station. The task of determining when an enrolled vehicle is approaching the location of an inspection station can be performed using a processor disposed in the vehicle, or at a remote location separate from both the vehicle and the inspection station, or at the inspection station. The inspection stations can be mobile so that their locations are varied to prevent operators from intentionally avoiding an inspection, as may occur with fixed inspection stations.

9 Claims, 3 Drawing Sheets

METHOD AND APPARATUS FOR IMPLEMENTING A VEHICLE INSPECTION WAIVER PROGRAM

RELATED APPLICATIONS

This application is a continuation of prior copending application, Ser. No. 12/959,182, filed on Dec. 2, 2010, the benefit of the filing date of which is hereby claimed under 35 U.S.C. §120.

BACKGROUND

Federal and State Departments of Transportation (DOT) and the law enforcement agencies of the various states inspect many commercial heavy vehicles annually. In the past, most such inspections have been performed at weigh stations located on interstate highways. Trucks passing the weigh station must pull over, and wait in line to be weighed and possibly inspected. Inspections on selected vehicles are performed based on weight violations or random sampling. Because of the sheer number of trucks operating on U.S. highways, only a fraction of the entire trucking fleet is inspected each year.

There have been screening systems and waiver inspection systems developed that have received support from regulatory agencies and the trucking industry, to make inspections more efficient. Such systems attempt to reduce the number of trucks potentially needing inspections, by removing vehicles from selected operators meeting defined criteria from the pool of vehicles potentially needing inspections.

One such screening system is based on a review of a trucking company's safety performance. If an operator can show that they have a good safety and compliance record, and are properly permitted and insured, the operator may be eligible to participate in the screening system. Specific equipment is added to their fleet vehicles. At about 300 weigh stations in the U.S., the added vehicle equipment communicates with the weigh station as the vehicle approaches. The weigh station component automatically reviews the operator's credentials, and if the operator is approved to bypass the weigh station, then a message to that effect is sent to the driver. The government regulatory agencies like this approach, because it reduces the number of trucks entering the weigh stations, enabling the regulatory agencies to focus their inspection efforts on vehicle operators who have not been prequalified. The trucking industry likes this approach because minimizing idle time while waiting in line for an inspection increases operating efficiency.

While this screening system has worked for years, it has several flaws. First, the equipment is dated and will soon need to be replaced. Equipping each participating weigh station with the required equipment costs hundreds of thousands of dollars. Also, marginal operators, who don't want to be inspected because their equipment would likely fail the inspection, generally know the physical locations of the weigh stations, and can actively plan their routes to bypass these fixed facilities.

It would be desirable to provide method and apparatus that enables reliable operators to be efficiently prescreened, so that regulatory or enforcement agencies can focus their time and effort performing inspections on vehicle operators that may be statistically more likely to be operating with one or more safety conditions that place the public at risk.

Regulatory and enforcement agencies might then devote more resources to preventing the marginal operators from avoiding inspections.

SUMMARY

The concepts disclosed herein provides method and apparatus that addresses the concerns leading to the development of prior art screening systems, in a more cost effective and efficient manner, while offering enhanced capabilities.

A key aspect of the concepts disclosed herein is to equip each participating vehicle with a position sensing system, such as a Global Positioning System (GPS), that enables the enrolled vehicle to communicate its position in real-time with a remote computing device (such as a networked server or data center). A regulatory agency (such as the Federal DOT, a State DOT, or a State Patrol) has access to the position data for each enrolled vehicle, even if the server (i.e., the remote computing device) is operated by a third party. As many fleet operators understand the benefits of including such GPS systems in their vehicles, this requirement will not add significant costs to the participation of fleet operators. Some fleet operators will need to replace older GPS units with a GPS unit having a transmitter and receiver that are able to bi-directionally communicate wirelessly with a remote computing system, but the benefits of being able to participate in a regulatory agency approved inspection waiver program will likely be sufficient to offset such costs. Costs for the regulatory agencies should be minimal, since rather than requiring the addition or replacement of expensive equipment dedicated to the prior art screening systems, weigh stations or inspection stations will only need to be able to communicate with a computing system where information on the prequalification status of operators is stored, and a computing system where current GPS data from enrolled vehicles are stored. In other words, the inspection stations would only need a computing device with an Internet connection, or the inspection stations can simply communicate with a user having access to a remote computing device at a different location via telephone, or even allow a remote computing device at a different location to manage the inspection waiver program altogether, without direct involvement by the inspection station.

The functions of comparing the real-time position data of enrolled vehicles with the locations of inspection stations (to identify enrolled vehicles approaching an inspection station) and of determining if a bypass confirmation should be sent to the approaching enrolled vehicle can be implemented using the same computing device, or different computing devices disposed at different locations. In some embodiments, the regulatory agency operates the computing system where the prequalification status of operators is stored (enabling the regulatory agency's computing system to perform the function of determining if a bypass confirmation should be sent to the approaching enrolled vehicle), and a vendor managing the inspection waiver program operates the computing system where the current GPS data from enrolled vehicles are stored (enabling the vendor's computing system to perform the function of comparing the real-time position data of enrolled vehicles with the locations of inspection stations), but various combinations and permutations can be implemented, so long as the required data (the prequalification status of a vehicle operator, position data from enrolled vehicles, and position data defining the location of inspection locations) are accessible to enable the functionality described to be implemented.

In the context of a fixed inspection station (such as a weigh station), data defining the real-time location of enrolled vehicles (i.e., the GPS data communicated from enrolled vehicles to a remote computing device) are analyzed, and data identifying a enrolled vehicle approaching a fixed inspection station are flagged. In one exemplary embodiment, the prequalified status of a specific vehicle or vehicle operator is assumed to be unchanged, and a communication is transmitted to the vehicle instructing the driver that the inspection station can be bypassed, whenever it is determined that the specific enrolled vehicle is approaching an inspection station. In at least some embodiments, the identity of vehicles approaching the inspection station is conveyed to either a vendor managing the inspection waiver program or the operator of the inspection station, so that a determination can be made as to whether specific approaching vehicles should be allowed to bypass the inspection station. (As used herein, the term "operator of an inspection station" is intended to encompass any authorized personnel working at the inspection station.) In another exemplary embodiment, which recognizes that there may be instances where the prequalification status of an operator is subject to change (exemplary, but not limiting causes for revoking prequalification or inspection waiver privileges include the vehicle operator suffering a plurality of accidents, the vehicle operator being in financial distress, or the vehicle operator having failed to make required tax or permit payments), as the vehicle approaches an inspection station, the prequalified status of the vehicle/operator is verified by consulting data that include the current status of the operator (i.e., data that will indicate whether the prequalification for that operator has been revoked), before communicating with the vehicle that bypassing the inspection station has been approved. If the prequalification status has been revoked for some reason, a communication is sent to the vehicle telling the driver that the inspection station cannot be bypassed.

Because the relative positions of the inspection station and each vehicle being tracked in real-time are known, it is a relatively simple computational task to identify vehicles that are approaching the inspection station along adjacent roads.

The system discussed above relies on knowing the location of the inspection facility and the location of enrolled vehicles that are part of the prequalification/inspection waiver program, which offers a very significant advantage over prior art screening systems, since new inspection stations can be defined without any capital investment beyond the cost for a simple programming change. To define a new inspection station, the regulatory agency simply adds the geographical coordinates corresponding to the new inspection station to the computing system that analyzes the real-time locations of the enrolled vehicles (note that the use of geographical coordinates for defining the location of the new or mobile inspection station is exemplary, as other techniques, such as providing a street address or an intersection, could also be used to define the location of an inspection station). This benefit has significant implications with respect to the ability of regulatory agencies to inspect vehicles that may be intentionally bypassing known weigh stations or known inspection stations, in an attempt to avoid an inspection. For example, for a specific fixed inspection station, the regulatory agency managing that inspection station may determine that there are three different logical routes a vehicle could use to bypass the fixed inspection station. The regulatory agency can dispatch a mobile inspection team to set up a temporary inspection station along one or more of those alternate routes. As soon as the mobile inspection team is ready, the coordinates of the new inspection station are added to the system tracking the real-time locations of the enrolled vehicles. The system analyzes the data defining the relative positions of the participating vehicles and all identified inspection stations (including the newly identified mobile inspection station). A communication is sent to each preapproved enrolled vehicle as it approaches the new mobile inspection station(s), generally as discussed above, informing the driver of the enrolled vehicle that he can bypass the new inspection station. Vehicles that are not preapproved (or whose preapproval/inspection waiver status has been revoked) are required to stop at the new inspection station(s). The regulatory agency can change the locations of the mobile inspection stations very easily, and drivers who actively seek to avoid inspections will have a very difficult time predicting where future inspection points may be located. A mobile inspection station for temporary use can be implemented using a vehicle for the inspection crew, a data link (which can be omitted if a remote computing device at a different location is handling the task of tracking enrolled vehicle locations and issuing bypass confirmations), and minimal traffic directing equipment (such as traffic cones). Mobile inspection stations can quickly be set up where there is a level area (preferably paved) on which vehicles can pull off a road or freeway to wait for inspection. Parking lots, rest areas, and roads carrying relatively small volumes of traffic can be employed for this purpose, as well as parking lots at public areas such as libraries and schools.

The advantages to the regulatory community are significant, perhaps sufficiently so that incentives will be provided to encourage vehicle operators to participate. Rather than investing money in replacing equipment at weigh stations, whose fixed locations can be bypassed by operators wanting to avoid inspections, the regulatory agency can set up random mobile inspection stations (these inspection stations can be moved periodically, and can be positioned along routes that might be used to bypass the fixed weigh stations). These mobile inspection stations may not always be able to actually weigh vehicles (portable scales are available, and can be employed if the operator of the mobile inspection station wants to have that capability), but can enable safety and compliance inspections to be performed at locations that vehicle drivers attempting to avoid fixed inspection locations will have difficulty avoiding.

In at least one exemplary embodiment, based on information from the regulatory agency regarding the location of the mobile or temporary inspection station, the computing device analyzing the location of participating vehicles based on using real-time GPS data will define a geofence, and monitor the real-time position data from all enrolled vehicles, so that the inspection waiver system knows when an enrolled vehicle is approaching one of the inspection stations.

Basic elements in a system for implementing the concepts disclosed herein include at least one enrolled vehicle, a position tracking component in each enrolled vehicle (such as a GPS tracking device), a bi-directional communication link in each enrolled vehicle for communicating with a remote computing device (which in an exemplary embodiment is integrated into the GPS unit as a wireless bi-directional data link), and a remote computing device with a processor for analyzing the real-time locations of participating vehicles and defined inspection stations (permanent or mobile). It should be recognized that these basic elements can be combined in many different configurations to achieve the exemplary method discussed above. Thus, the details provided herein are intended to be exemplary, and not limiting on the scope of the concepts disclosed herein.

The term "real-time" is not intended to imply the data are transmitted instantaneously, but instead indicate that the data are collected over a relatively short period of time (over a period of seconds or minutes), and transmitted to the remote computing device on an ongoing basis, as opposed to being stored at the vehicle for an extended period of time (hour or days), and then transmitting to the remote computing device as an extended data set, after the data set has been collected.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. Further, it should be understood that any feature of one embodiment disclosed herein can be combined with one or more features of any other embodiment that is disclosed, unless otherwise indicated.

As used herein and in the claims that follow, a reference to an activity that occurs in real-time is intended to refer not only to an activity that occurs with no delay, but also to an activity that occurs with a relatively short delay (i.e., a delay or lag period of seconds or minutes, but with less than an hour of lag time).

Figure 1:
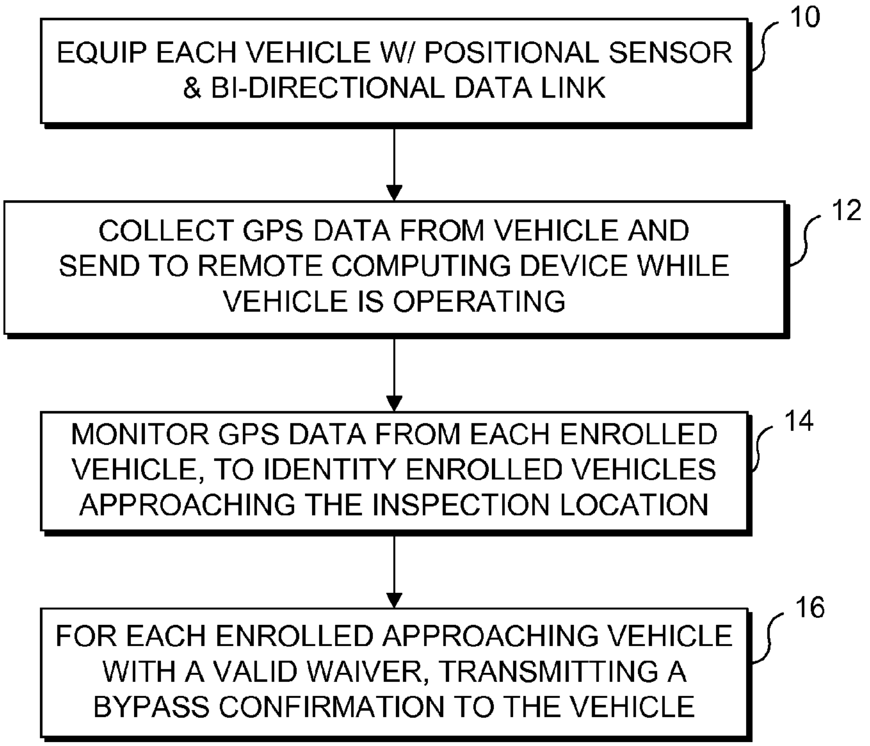
FIG. 1 is a high level logic diagram showing exemplary overall method steps implemented in accord with the concepts disclosed herein to increase the efficiency of vehicle inspections, by enabling selected prescreened vehicles to bypass fixed or mobile inspection stations.

FIG. 1 is a high level flow chart showing exemplary overall method steps implemented in accord with one aspect of the concepts disclosed herein, to collect position data from vehicles enrolled in an inspection waiver program, to determine which enrolled vehicles are approaching a fixed or mobile inspection station, so that vehicles having a valid waiver receive a bypass confirmation before they reach the inspection station. Vehicles that do not receive such a bypass confirmation are required to stop at the inspection station, where the operator of the inspection station determines whether an inspection will be performed. The delay at the inspection station reduces the efficiency of the vehicle operator, which reduces income, so vehicle operators are motivated to participate in the inspection waiver program, as long as the costs associated with the waiver program are offset by the productivity savings. Regulators operating the inspection stations are motivated to participate in the inspection waiver program, because the capital costs are modest, and allowing prescreened vehicles to bypass the inspection stations enables the staff of the inspection station to focus their efforts on vehicle operators who have not been prescreened, and who may be more likely to be operating with one or more defects that puts the public at risk. The concepts disclosed herein offer regulators the ability to use mobile inspection stations as well as fixed inspection stations. One significant problem with past inspection waiver programs limited to fixed inspection stations was that because the whereabouts of the fixed inspection stations were widely known, vehicle operators who wanted to avoid inspection could easily change their route to bypass the fixed inspection stations, specifically for the purpose of avoiding inspection.

Referring to FIG. 1, in a block 10, each enrolled vehicle is equipped with a geographical position sensor/position tracking component (a GPS unit being an exemplary type of position sensor, but other sensor technology might be used instead, such as cell tower triangulation), so that geographical position data can be collected when the vehicle is being operated, and a bi-directional data link. The position tracking component and the bi-directional data link can be integrated into a single device, or these components can be implemented as separate devices (it should be noted that the bi-directional data link could even be implemented as a discrete receiver and a discrete transmitter). A wireless radio frequency (RF) transmitter/receiver combination represents an exemplary bi-directional data link. The bi-directional data link enables the vehicle to convey the position data collected by the position tracking component to a remote computing device, as indicated in a block 12, and enables the vehicle to receive a bypass confirmation when a qualified vehicle is allowed to bypass a particular inspection station, as indicated in a block 16. It should be recognized that the use of RF data transmission is exemplary, and not limiting, as other types of wireless data transmission (such as, but not limited to, optical data transmission) can be employed.

In a block 14, a processor is used to automatically compare position data from each enrolled vehicle with the known position of each inspection station (in some exemplary embodiments there is only a single inspection station, while in other exemplary embodiments, there are a plurality of inspection stations), to identify each enrolled vehicle that is approaching an inspection station. It should be recognized that the concepts disclosed herein encompass embodiments where a vehicle relatively far away (i.e., a mile or more) from an inspection station is considered to be approaching the inspection station, as well as embodiments where the enrolled vehicle must be substantially closer to the inspection station (i.e., much less than a mile) to be considered to be approaching the inspection station. Where the inspection station is located proximate a freeway, and the enrolled vehicles are likely to be moving at freeway speeds (e.g., 55-70 mph), then the relative distance between an enrolled vehicle and the inspection station will likely be greater than for an inspection station located on a secondary road where traffic moves at a much slower pace. In at least some embodiments, the approaching parameter will not be evaluated based on any specific distance, but rather based on the local conditions of a specific road where the inspection station is located. For example, if the inspection station is located on a north bound freeway, and is accessible using an off ramp, any enrolled vehicle traveling on that freeway in the northbound direction that has passed the freeway exit immediately south of the inspection station can be considered to be approaching the inspection station, even if that specific exit is miles away (because there is no way for the vehicle to continue making northbound progress without passing the inspection station). Thus, it should be understood that the concept of determining whether a vehicle is approaching an inspection station can be determined in terms of absolute distance, as well as in terms of the position of the vehicle relative to a specific reference location (such as a particular freeway off ramp, or a particular intersection). As discussed below, a geofence can be used to evaluate whether a vehicle is approaching an inspection station.

As noted above, once it has been determined that a specific enrolled vehicle is approaching an inspection station, then a bypass confirmation is conveyed to the vehicle over the bi-directional data link in block 16, to inform the operator of the enrolled vehicle that the enrolled vehicle is approved to bypass the inspection station. As discussed in detail below, in some embodiments, the bypass confirmation will generally be sent to any enrolled vehicle that approaches the inspection stations, while in other embodiments, the current status of the vehicle or vehicle operator is reviewed (after it is determined the enrolled vehicle is approaching the inspection station), to verify that inspection waiver status of that enrolled vehicle (or operator) has not been revoked, before a bypass confirmation is sent to the approaching enrolled vehicle. In at least some embodiments, operators of an inspection station can elect to prevent a bypass confirmation from being conveyed to an enrolled vehicle, if the inspection station determines that they want to inspect that vehicle despite the waiver.

In at least some embodiments, the steps noted above are implemented for a plurality of enrolled vehicles and a plurality of inspection stations. Note that in some instances, more than one enrolled vehicle can be approaching the same inspection station at about the same time. It should be understood that the position data conveyed to the remote computing device by each enrolled vehicle uniquely identifies that vehicle (by including identification (ID) data along with the position data), so that the bypass confirmation can be conveyed to the appropriate enrolled vehicle, and so that any enrolled vehicle for which the inspection waiver status has been revoked can be distinguished from enrolled vehicles for which the inspection waiver status is still valid.

Figure 2:
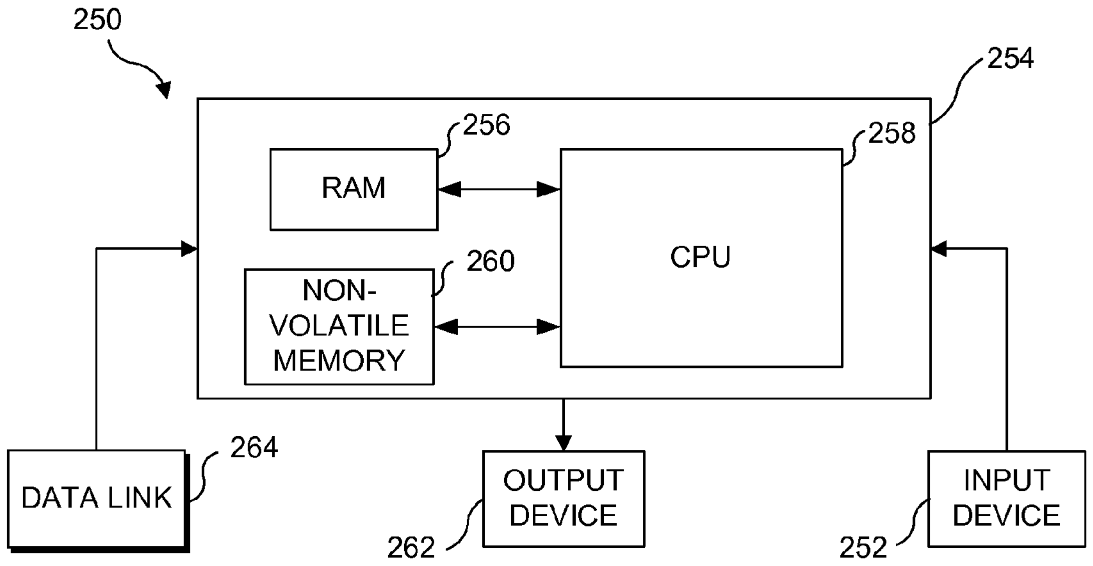
FIG. 2 is a functional block diagram of an exemplary computing device that can be employed to implement some of the method steps disclosed herein.

In general, the analysis of the position data received from enrolled vehicles, to identify enrolled vehicles approaching an inspection station, will be carried out by a remote computing device. The remote computing device in at least one embodiment comprises a computing system controlled by the personnel located at the inspection station, while in other exemplary embodiments, the remote computing device is controlled by a third party or vendor who manages the inspection waiver program for the benefit of the operators of the enrolled vehicles and the operators of the inspection stations (in some embodiments, the third party bills the vehicle operators/owners and/or the inspection station agencies a subscription fee). The remote computing device can be operating in a networked environment. FIG. 2 schematically illustrates an exemplary computing system 250 suitable for use in implementing the method of FIG. 1 (i.e., for executing at least block 14 of FIG. 1, and in some embodiments, block 16 as well). Exemplary computing system 250 includes a processing unit 254 that is functionally coupled to an input device 252 and to an output device 262, e.g., a display (which can be used to output a result to a user, although such a result can also be stored or transmitted to a different site). Processing unit 254 comprises, for example, a central processing unit (CPU) 258 that executes machine instructions for carrying out an analysis of position data collected from enrolled vehicles, to determine which enrolled vehicles are approaching an inspection station. The machine instructions implement functions generally consistent with those described above with respect to block 14 of FIG. 1. CPUs suitable for this purpose are available, for example, from Intel Corporation, AMD Corporation, Motorola Corporation, and other sources, as will be well known to those of ordinary skill in this art.

Also included in processing unit 254 are a random access memory (RAM) 256 and non-volatile memory 260, which can include read only memory (ROM) and may include some form of non-transitory memory storage, such as a hard drive, optical disk (and drive), etc. These non-transitory memory devices are bi-directionally coupled to CPU 258. Such storage devices are well known in the art. Machine instructions and data are temporarily loaded into RAM 256 from non-volatile memory 260. Also stored in the non-volatile memory are software for an operating system run by the CPU, and ancillary software. While not separately shown, it will be understood that a generally conventional power supply will be included to provide electrical power at voltage and current levels appropriate to energize computing system 250.

Input device 252 can be any device or mechanism that facilitates user input into the operating environment, including, but not limited to, one or more of a mouse or other pointing device for manipulating a cursor and making selections for input, a keyboard, a microphone, a modem, or other input device. In general, the input device will be used to initially configure computing system 250, to achieve the desired processing (i.e., to analyze position data collected from enrolled vehicles, to determine which enrolled vehicles are approaching an inspection station). Configuration of computing system 250 to achieve the desired processing includes the steps of loading appropriate processing software that includes machine readable and executable instructions into non-volatile memory 260, and launching the processing application (e.g., executing the processing software loaded into RAM 256 with the CPU) so that the processing application is ready for use. Output device 262 generally includes any device that produces output information, but will most typically comprise a monitor or computer display designed for human visual perception of output text and/or graphics. Use of a conventional computer keyboard for input device 252 and a computer display for output device 262 should be considered as exemplary, rather than as limiting on the scope of this system. Data link 264 is configured to enable position data collected in connection with operation of enrolled vehicles to be input into computing system 250 for analysis to determine which enrolled vehicles are approaching an inspection station. Those of ordinary skill in the art will readily recognize that many types of data links can be implemented, including, but not limited to, universal serial bus (USB) ports, parallel ports, serial ports, inputs configured to couple with portable non-transitory memory storage devices, FireWire ports, infrared data ports, wireless data communication such as Wi-Fi and Bluetooth™, network connections via Ethernet ports, and other connections that employ the Internet or couple to some local area or wide area network. Position data from the enrolled vehicles is communicated wirelessly, either directly to the remote computing system that analyzes the position data to determine the enrolled vehicles that are approaching an inspection station, or to some short-term storage location or remote computing system that is linked to computing system 250.

It should be understood that the term "remote computer" and the term "remote computing device" are intended to encompass networked computers, including servers and clients, in private networks or as part of the Internet. The position data for enrolled vehicles and the location data of each inspection station can be stored by one element in such a network, retrieved for review by another element in the network, and analyzed by yet another element in the network—all in rapid sequence. In at least one embodiment, a vendor is responsible for storing the position data in a network accessible storage, and clients of the vendor are able to access and manipulate the data in the storage. While implementation of the method noted above has been discussed in terms of execution of machine instructions by a processor or CPU (i.e., the computing device implementing machine instructions to implement the specific functions noted above), the method could alternatively be implemented using a custom hardwire logic circuit (such as an application specific integrated circuit), or other type of dedicated logic device.

Figure 3:
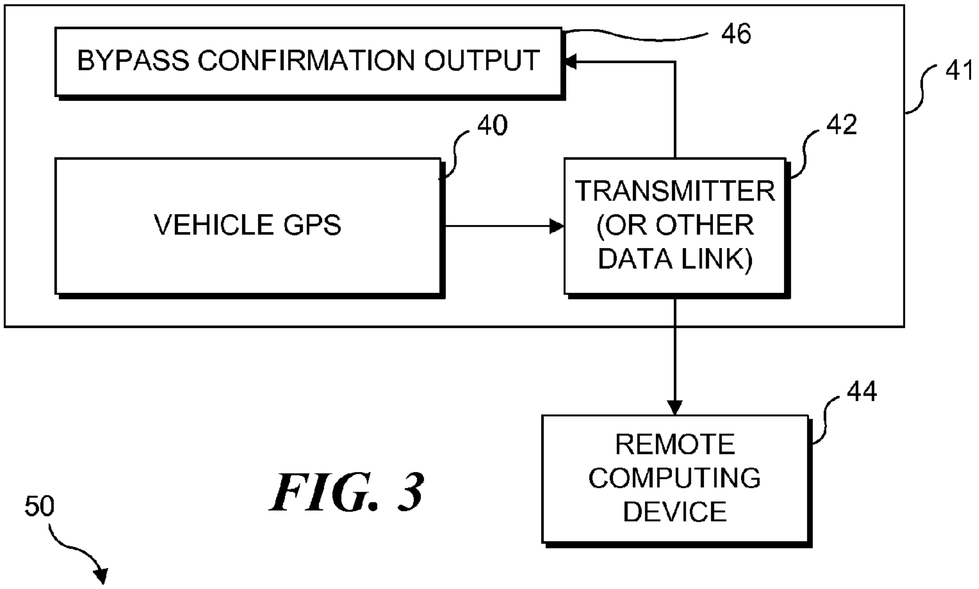
FIG. 3 is a functional block diagram of an exemplary vehicle employed to implement some of the concepts disclosed herein.

FIG. 3 is a functional block diagram of exemplary components used in vehicles enrolled in the inspection waiver program, which are used in each enrolled vehicle 41 to implement some of the method steps shown in FIG. 1. An exemplary inspection waiver program is based on use of a position sensing system 40 (which in this embodiment is a GPS device, noting that the use of a GPS device is exemplary but not limiting, since other types of position sensing systems could instead be employed) and a bi-directional data link 42 to each enrolled vehicle. As noted above, in an exemplary embodiment, this data link is a combination RF transmitter and receiver, although separate transmitters and receivers could instead be used. It should be recognized that the one or more RF transmitters/receivers could be included in the GPS unit to achieve lower cost functionality.

An output 46 is also included, to provide the bypass confirmation to the driver in a form that can be easily (and safely) perceived by the driver. For example, output 46 can be implemented using one or more light sources (for example, a green light can indicate that the bypass confirmation was received and/or a red light can be used to indicate the bypass confirmation was not received (or that a bypass denial communication was received)), using a speaker providing an audible output indicating either that the bypass confirmation was received or that it was denied, and a display providing a visual output indicating in text and/or graphics that the bypass confirmation was either received, or denied. Output 46 can be incorporated into position sensing system 40, if desired. Thus, the concepts disclosed herein encompass embodiments where the functions of user output, position tracking, and bi-directional communication can be implemented within a single component. Bi-directional data link 42 is used to convey real-time position data from the enrolled vehicle to a remote computing device 44 (which can then determine the enrolled vehicles that are approaching an inspection location), and to receive the confirmation.

In a related embodiment, position sensing system 40 includes a processor that performs the function of determining if the enrolled vehicle is approaching an inspection station. In such an embodiment, when position sensing system 40 determines that the enrolled vehicle is approaching an inspection station, the position sensing system uses the bi-directional data link to ask a remote computing device for a bypass confirmation, which shifts some of the data processing to the enrolled vehicle. Note that such an embodiment requires the position sensing system processor (or some other vehicle processor logically coupled to the position sensing system, which is used to implement the function of determining if the vehicle is approaching an inspection station) to be able to receive regular updates for the inspection stations, whose positions may vary over time (i.e., in some embodiments the inspection stations are mobile, and the inspection station operator will move the inspection station at their discretion). Data relating to the inspection stations can be stored in each enrolled vehicle, with the bi-directional data link being used to acquire updated inspection station data. Alternatively, the inspection station may transmit a signal to enrolled vehicles to indicate that the inspection station is in the vicinity of the vehicle. Note that using a remote computer to determine if an enrolled vehicle is approaching an inspection station is somewhat easier to implement, since data defining the inspection stations would not need to be stored or updated in the enrolled vehicles, or the cost of a transmitter or other signal source to alert the enrolled vehicle of the nearby inspection station would not need to be incurred.

As noted above, the position data in at least some (if not all) embodiments will include an ID component that enables each enrolled vehicle to be uniquely identified. Thus, position sensing system 40 can include an ID data input device that is used to uniquely identify the vehicle. In one embodiment, the ID data input device comprises a numeric or alphanumeric keypad, or function keys logically coupled to position sensing system 40. It should be recognized, however, that other data input devices (i.e., devices other than keypads) can instead be employed to input the ID data for a vehicle, and the concepts disclosed herein are not limited to any specific ID data input device.

Figure 4:
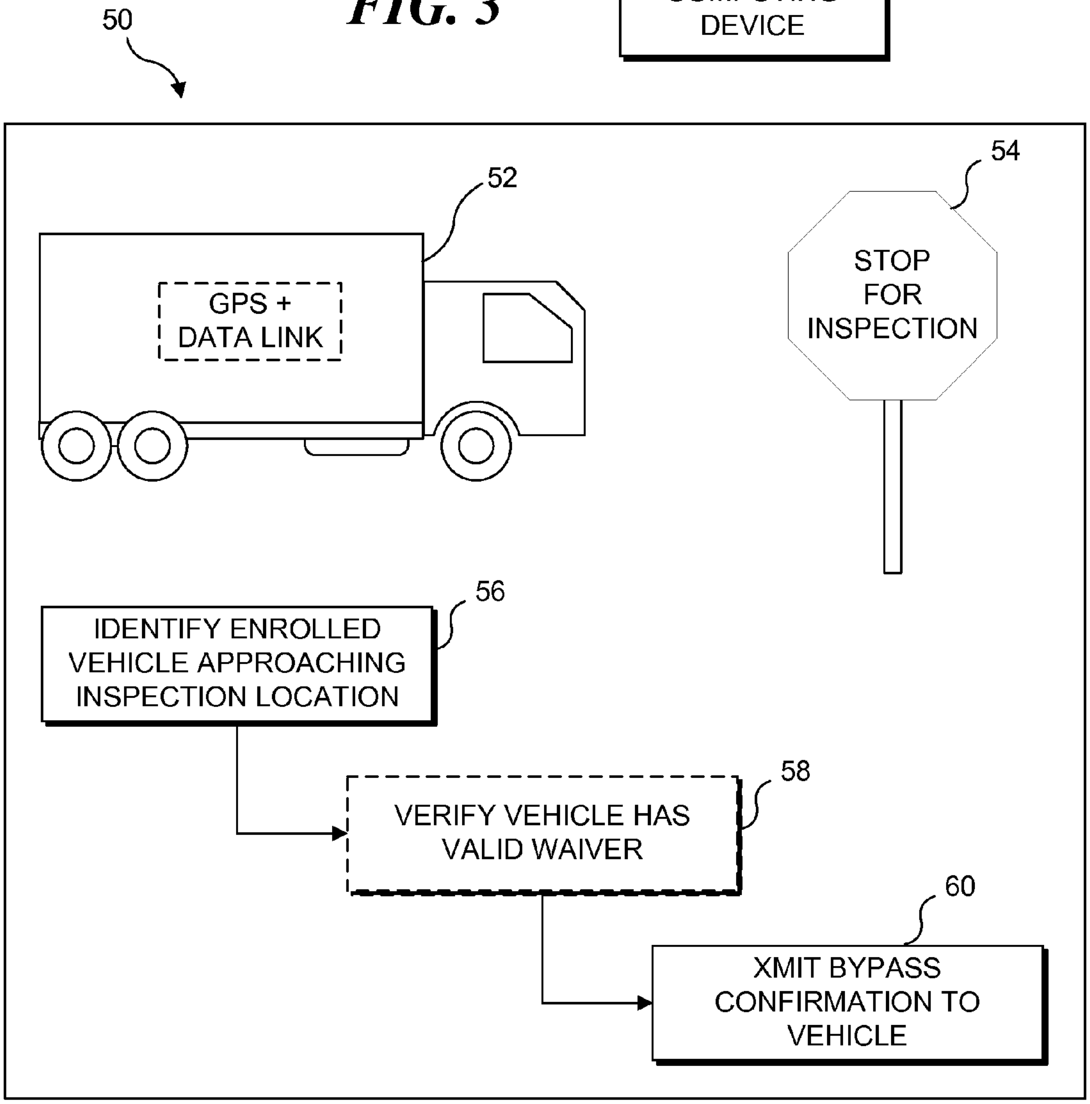
FIG. 4 is an exemplary functional block diagram showing the basic functional components used to implement the method steps of FIG. 1.

FIG. 4 is a functional block diagram of an exemplary system 50 that can be employed to implement the method steps of FIG. 1. The components include at least one enrolled vehicle 52, at least one inspection station 54, a component 56 that implements the function of identifying enrolled vehicles approaching an inspection station, a component 58 that implements the function of verifying whether an inspection waiver for a particular enrolled vehicle is valid, and a component 60 that conveys a bypass confirmation to the enrolled vehicle approaching the inspection station.

Vehicle 52 includes the position sensing component, and bi-directional data link 42 discussed above in connection with FIG. 3 (and, in at least some embodiments, the output component, while at least some embodiments will include the ID data input device). It should be recognized that the functions implemented by components 56, 58, and 60 can be performed by a single component, or different combinations of the components as integral devices.

In a first exemplary embodiment of system 50, the functions of components 56, 58, and 60 are implemented by a remote computing device disposed at a location spaced apart from vehicle 52 and from inspection station 54. That remote computing device has access to the position data collected by and received from enrolled vehicle 52, and access to a data link capable of conveying the bypass confirmation to enrolled vehicle 52. In this exemplary embodiment, the function of component 58 can be implemented by consulting a non-transitory memory in which the identity of each vehicle having a valid waiver is stored. If desired, the function of component 58 can also be implemented by sending a query from the remote computing device to personnel at inspection station 54, to let the personnel of inspection station 54 make the determination as to whether the bypass confirmation should be conveyed to enrolled vehicle 52.

In a second exemplary embodiment of system 50, the function of component 56 is implemented by a remote computing device disposed at a location spaced apart from both vehicle 52 and inspection station 54. That remote computing device has access to position data collected by and received from enrolled vehicle 52, and access to a data link capable of conveying data to inspection station 54, which itself has access to a data link capable of conveying the bypass confirmation to enrolled vehicle 52. In this exemplary embodiment, once the remote computing device disposed at a location spaced apart from vehicle 52 and inspection station 54 determines that an enrolled vehicle is approaching inspection station 54, the remote computing device conveys that data to the inspection station. The operator or other personnel at inspection station 54 can then make the determination as to whether the bypass confirmation should be conveyed to enrolled vehicle 52. Thus, in this embodiment, the functions implemented by components 58 and 60 occur at the inspection station.

In a third exemplary embodiment of system 50, the functions of components 56, 58, and 60 are implemented by a computing device disposed at inspection station 54. That computing device has access to position data collected by and received from enrolled vehicle 52, and access to a data link capable of conveying the bypass confirmation to enrolled vehicle 52. In this exemplary embodiment, the function of component 58 can be implemented by consulting a non-transitory memory in which the identity of each vehicle having a valid waiver is stored, or by allowing the operator or other personnel at inspection station 54 to make the determination as to whether the bypass confirmation should be conveyed to enrolled vehicle 52.

In a fourth exemplary embodiment of system 50, the functions of components 56 and 58 are implemented by a remote computing device disposed at a location spaced apart from both vehicle 52 and inspection station 54. That remote computing device has access to position data collected by and received from enrolled vehicle 52, and access to a data link capable of conveying data to inspection station 54. In this exemplary embodiment, the function(s) of component 58 can be implemented by consulting a non-transitory memory or data store in which the identity of each vehicle having a valid waiver is stored. If desired, the function(s) of component 58 can also be implemented by sending a query from the remote computing device to the operator or other personnel of inspection station 54, to let the operator or others at inspection station 54 make the determination as to whether the bypass confirmation should be conveyed to enrolled vehicle 52. In this embodiment, the function implemented by component 60 (i.e., conveying the bypass confirmation to enrolled vehicle 52) occurs at the inspection station, after receipt of information from the computing device located away from the inspection station that implements the function of component 56 (and component 58, when the function(s) implemented by component 58 is/are performed).

In a fifth exemplary embodiment of system 50, the function of component 56 is implemented by a processor in enrolled vehicle 52, which has access to data defining the location of each inspection station 54 (or receives a wireless transmission indicating when the vehicle is near such an inspection station). In at least one embodiment, these data are stored in a non-transitory memory or stored in the vehicle, while in at least one other exemplary embodiment, the processor in the vehicle uses the bi-directional data link to communicate with a remote storage where the data defining the location of each inspection station are stored, or alternatively, to receive a wireless signal indicating when the vehicle is near a specific inspection station. Once the processor in the vehicle (which can be the vehicle's onboard computer, a processor that is part of the position sensing component, a processor that is part of the bi-directional data link, or some other processor in the vehicle) determines that enrolled vehicle 52 is approaching inspection station 54, the bi-directional data link is used to request a bypass confirmation from component 60, which is implemented using a remote computing device having access to a data link for communicating with enrolled vehicle 52. In at least one embodiment, component 60 resides at inspection station 54, while in at least one other exemplary embodiment, component 60 resides at a location remote from both enrolled vehicle 52 and inspection station 54. In the fifth exemplary embodiment of system 50, the function(s) of component 58 can be implemented by the same computing device used to implement component 60, or by a different computing device at a different location.

With respect to the exemplary systems noted above, it should be understood that the term "computer" and the term "computing device" are intended to encompass networked computers, including servers and clients, in private networks or as part of the Internet or other local area or wide area network. The position data can be stored by one element in such a network, retrieved for review by another element in the network, and analyzed by yet another element in the network.

Still another aspect of the concepts disclosed herein is a method for enabling a user to manage an inspection waiver program for enrolled vehicles. In an exemplary embodiment, a user can set a geographical parameter defining the "location" of an inspection station, and analyze position data from enrolled vehicles in terms of the user defined geographical parameter, to determine which enrolled vehicles are approaching the inspection station. In a particularly preferred, but not limiting exemplary embodiment, the geographical parameter is a geofence, which can be generated by displaying a map to a user, and enabling the user to define a perimeter line or "fence" around any portion of the map encompassing the inspection station location.

Figure 5:
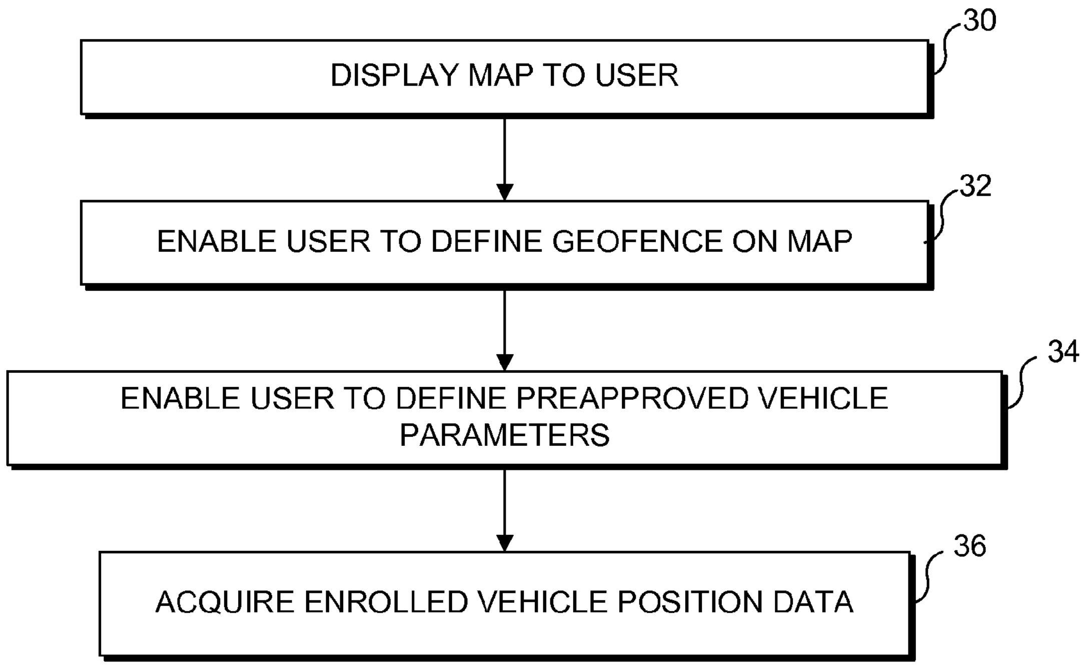
FIG. 5 is a high level logic diagram showing exemplary overall method steps implemented in accord with the concepts disclosed herein to manage a vehicle inspection waiver program.

FIG. 5 is a high level logic diagram showing exemplary overall method steps implemented in accord with the concepts disclosed herein, and summarized above, to collect and analyze position data collected from enrolled vehicles to determine which enrolled vehicles are approaching an inspection station, so that a bypass confirmation can be sent to enrolled vehicles who are authorized to bypass the inspection station. As noted above, in an exemplary but not limiting embodiment, the method of FIG. 5 is implemented on a computing system remote from the enrolled vehicle collecting the position data. In at least one exemplary, but not limiting embodiment, the enrolled vehicle position data are conveyed in real-time to a networked location, and accessed and manipulated by a user at a different location.

In a block 30, a map is displayed to a user. In a block 32, the user is enabled to define a geofence on the map (i.e., by prompting the user to define such a geofence, or simply waiting until the user provides such input). In general, a geofence is defined when a user draws a perimeter or line around a portion of the displayed map where the inspection station is located, using a computer enabled drawing tool, or cursor. Many different software programs enable users to define and select portions of a displayed map, e.g., by creating a quadrilateral region, or a circle, or by creating a free-hand curving line enclosing a region. Thus, detailed techniques for defining a geofence need not be discussed herein. The geofence is used to define how close an enrolled vehicle can approach an inspection location before triggering a determination of whether a bypass confirmation is to be sent to the enrolled vehicle (note this may include implementing both the functions of components 58 and 60 of FIG. 4, or just the function of component 60, generally as discussed above).

In a block 34, the user is enabled to define preapproved vehicle parameters. In the context of this step, the user might be working for the regulatory agency operating the inspection station. The step performed in block 34 enables the user to exert a greater level of control over determining whether a particular vehicle is allowed to bypass the inspection station. For example, assume a particular fleet operator is enrolled in the inspection waiver program, but it comes to the attention of the inspection station operator that the fleet operator in question is behind on permit fees or tax payments (or has recently been involved in an accident, or some other negative event that calls into question the reliability of that fleet operator). The step of block 34 enables the user to define some parameter that will result in some or all of that fleet operator's enrolled vehicles not receiving a bypass confirmation. Such parameters can be used to define specific vehicles that will be denied a bypass confirmation, specific locations of inspection stations for which that fleet operator's vehicles will be denied a bypass confirmation, specific times for which that fleet operator's vehicles will be denied a bypass confirmation, or even a specific frequency for which that fleet operator's vehicles will be denied a bypass confirmation (i.e., enabling the user to define that 10% (or some other selected percentage) of the time that the fleet operator's vehicles will be denied a bypass confirmation, for example, because the inspection station operator wants to inspect about 10% of the fleet operator's vehicles). If a particular inspection station has a low volume of vehicles to inspect at a particular point in time, the step of block 34 can be used to reduce the amount of bypass confirmations being issued during that time period, to ensure that the inspection station is more fully utilized for performing inspections. In this case, the denial of bypass confirmation need not be tied to any negative information about the vehicle operator.

In a block 36, position data for each enrolled vehicle is acquired, enabling the functions of components 56, 58, and 60 of FIG. 4 to be implemented, generally as discussed above.

The embodiments discussed above are based on sending a bypass communication to drivers if they are cleared to bypass an inspection station. It should be recognized that the concepts disclosed above also encompass embodiments where drivers enrolled in the inspection waiver program are trained to pull into inspection stations for inspection only if they receive a communication specifically instructing them to do so (i.e., no bypass communication is required, as drivers assume their waiver is valid unless they receive a communication to the contrary), as well as embodiments where drivers in the inspection waiver program are trained to pass inspection stations without stopping for inspection only if they receive a bypass communication specifically authorizing such action (i.e., the bypass communication is required, as drivers assume their waiver is not valid unless they receive a communication to the contrary). Note that in the latter embodiment, drivers will pull into inspection stations if an authorized bypass communication was sent to the enrolled vehicle, but some failure in transmission or receipt of the authorized bypass communication occurs.

As used herein, the term "vehicle operator" encompasses the driver of the vehicle, as well as the entity responsible for the vehicle, e.g., the owner of the vehicle and/or the party responsible for the operating authority under which the vehicle is operating.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A method for administering a vehicle inspection program in which enrolled vehicles are authorized to bypass an inspection station, comprising the steps of:

(a) automatically determining a current geographical location for an enrolled vehicle while the enrolled vehicle is being operated;

(b) based upon the current geographical location for the enrolled vehicle, automatically determining if the enrolled vehicle is approaching the inspection station; and (c) if the enrolled vehicle is approaching the inspection station, using a computing device to implement the function of determining a fleet operator of the enrolled vehicle and determining if the present time fits within a predesignated time window when all enrolled vehicles operated by the fleet operator are not permitted to bypass the inspection station, and if so, providing an indication to an operator of the enrolled vehicle to stop at the inspection station, even though the enrolled vehicle is enrolled in the vehicle inspection program would otherwise be permitted to bypass the inspection station.

2. The method of claim 1, wherein the inspection station comprises a mobile inspection station, whose geographical location is not fixed.

3. The method of claim 1, wherein the step of automatically determining if the enrolled vehicle is approaching the inspection station is performed at a location that is remote from both the inspection station and the enrolled vehicle.

4. The method of claim 1, wherein the step of automatically determining if the enrolled vehicle is approaching the inspection station is performed at the inspection station.

5. The method of claim 1, wherein the step of automatically determining if the enrolled vehicle is approaching the inspection station is performed at the enrolled vehicle.

6. A system for managing vehicle inspections, so as to selectively allow authorized vehicles enrolled in a waiver program to bypass an inspection station, while requiring non-authorized vehicles to stop at the inspection station, comprising:

(a) a position sensing component for each respective enrolled vehicle, the positioning sensing component determining a geographical position for the enrolled vehicle during operation of the enrolled vehicle;

(b) a processing component to implement a function of automatically identifying each respective enrolled vehicle approaching the inspection station based on the respective geographical position of each respective enrolled vehicle, the processing component further implementing a second function of automatically determining a respective fleet operator of each respective enrolled vehicle and automatically determining if the present time fits within a predesignated time window when all enrolled vehicles operated by the respective fleet operator are not permitted to bypass the inspection station even though each respective enrolled vehicle is enrolled in the waiver program and would otherwise be permitted to bypass the inspection station; and (c) a communication link for providing an indication to each respective operator of each respective enrolled vehicle that is approaching the inspection station, the indication informing each respective operator whether or not the respective enrolled vehicle is authorized to bypass the inspection station.

7. The system of claim 6, wherein the processing component is disposed at the inspection location.

8. The system of claim 6, wherein the processing component is disposed at a location remote from both the inspection station and each of the respective enrolled vehicles.

9. A non-transitory computer readable medium having machine instructions stored thereon for processing a geographical position for a vehicle enrolled in an inspection waiver program, to determine if the enrolled vehicle is authorized to bypass an inspection station that the enrolled vehicle is approaching, the machine instructions, when executed by a processor, carrying out the functions of:

(a) automatically comparing the geographical position for the enrolled vehicle with a geographical location of the inspection station, to determine when the enrolled vehicle is approaching the inspection station; and if so, (b) determining whether the enrolled vehicle has a valid inspection waiver and an identity of a fleet operator of the enrolled vehicle and determining that the current time does not fall in a mandatory inspection time window for all enrolled vehicles operated by the fleet operator, so that the enrolled vehicle receives authorization to bypass the inspection station without stopping.

* * * * *